Sept. 28, 1954      J. H. OSGOOD      2,690,373
INSPECTION AND RECORDING DEVICE

Original Filed Aug. 11, 1947      7 Sheets-Sheet 1

Inventor:
John H. Osgood
by Wm O Moeser

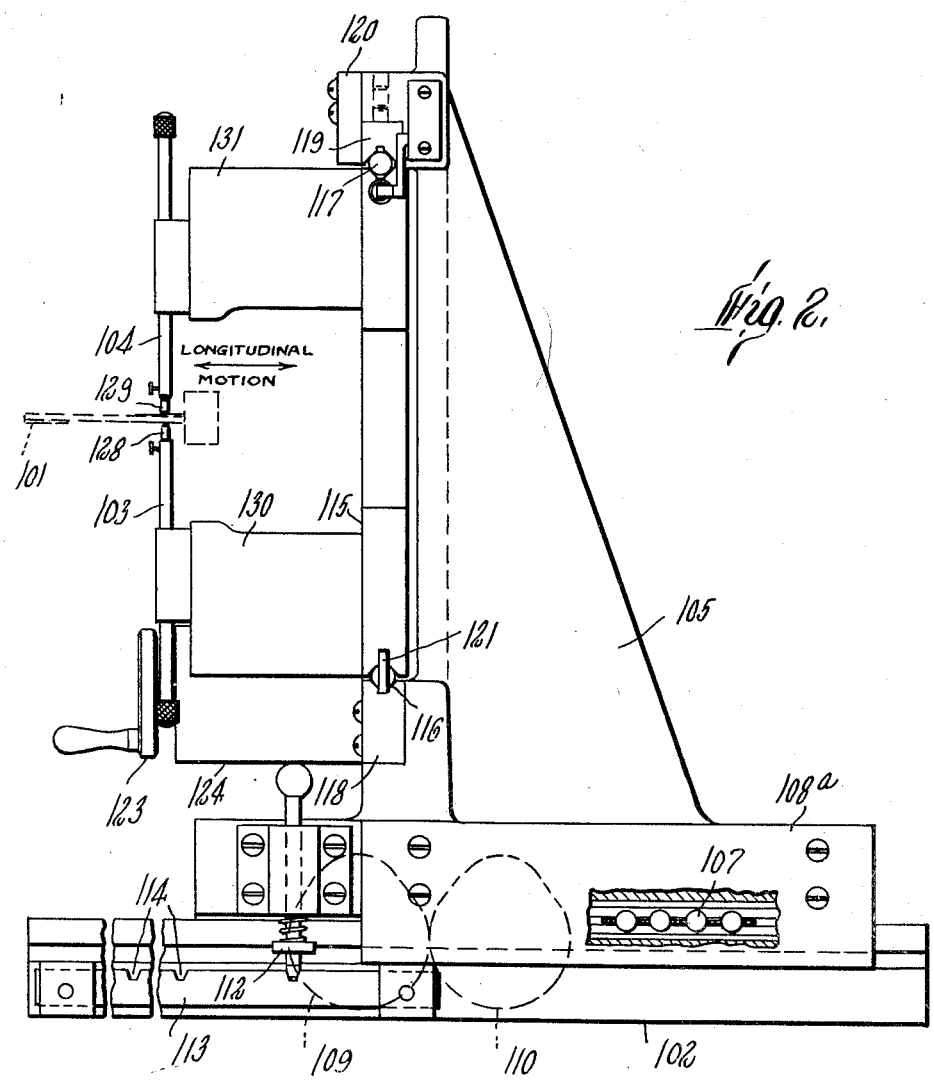

Sept. 28, 1954 J. H. OSGOOD 2,690,373
INSPECTION AND RECORDING DEVICE
Original Filed Aug. 11, 1947 7 Sheets-Sheet 3
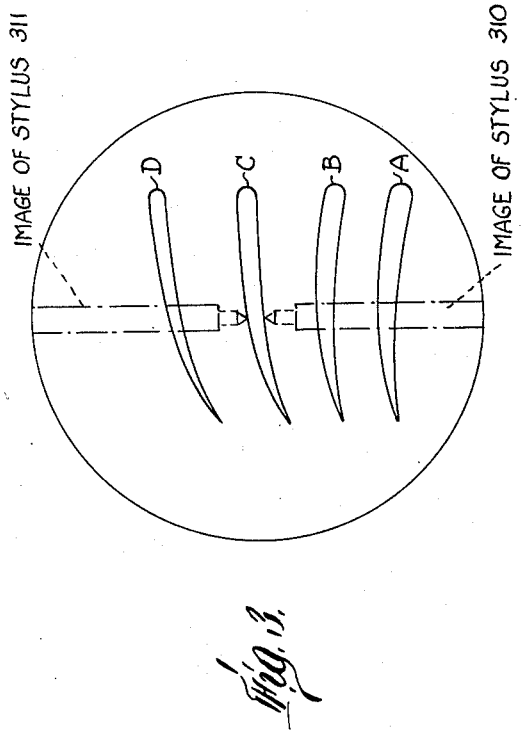
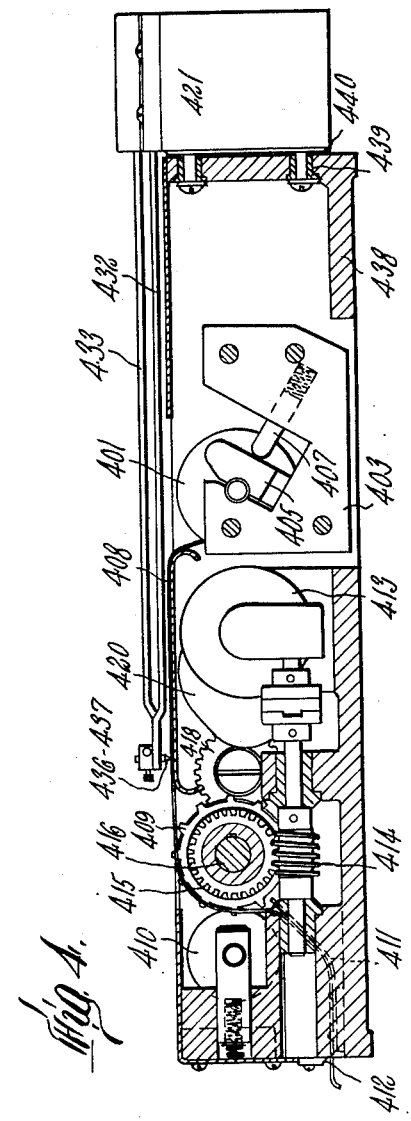
Inventor
JOHN H. OSGOOD
by Wm O Moeser Sept. 28, 1954 J. H. OSGOOD 2,690,373
INSPECTION AND RECORDING DEVICE
Original Filed Aug. 11, 1947 7 Sheets-Sheet 4
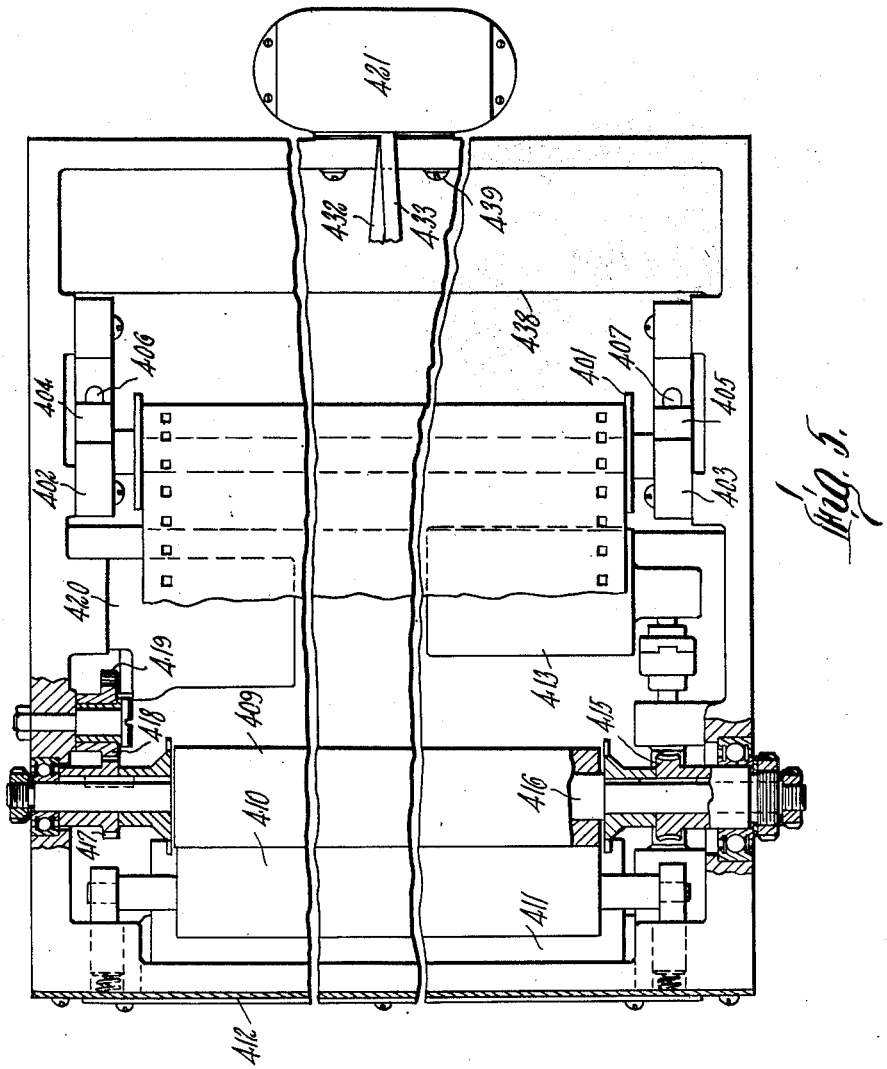
Inventor:
John H. Osgood
by Wm O Moeser

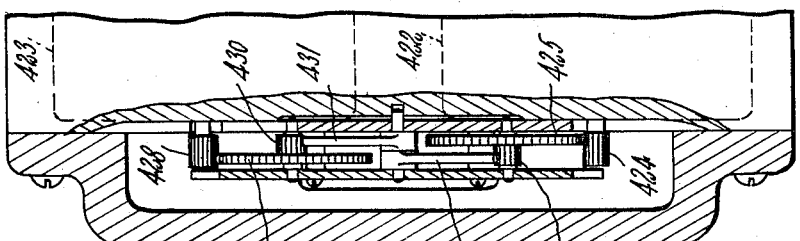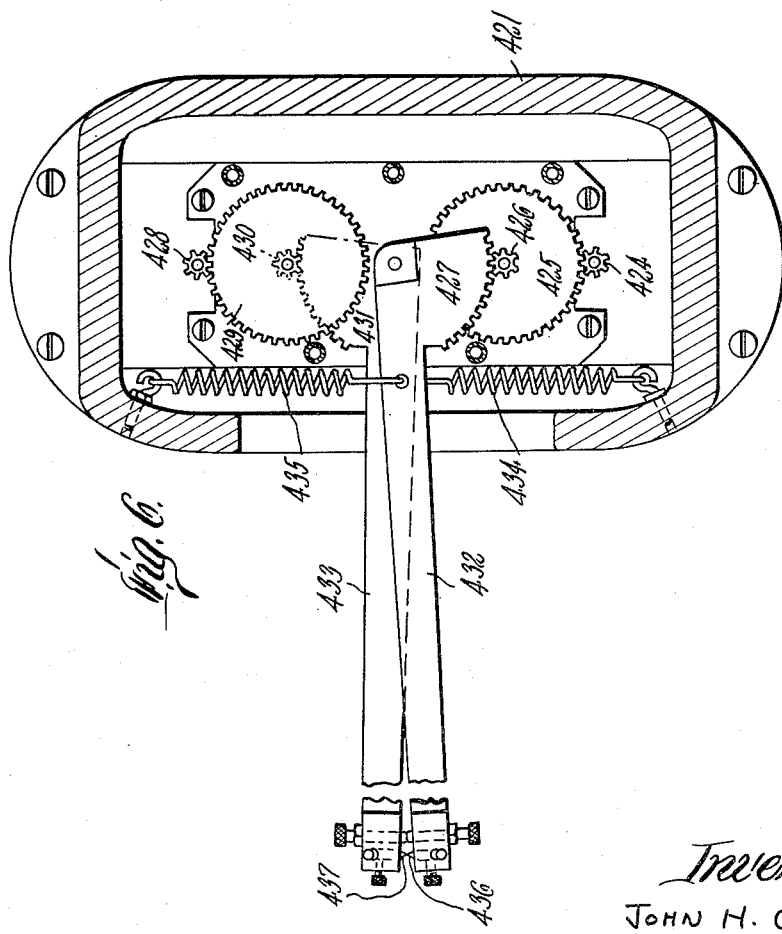

Sept. 28, 1954  J. H. OSGOOD  2,690,373
INSPECTION AND RECORDING DEVICE
Original Filed Aug. 11, 1947  7 Sheets-Sheet 6

Inventor:
JOHN H. OSGOOD
by Wm O Moeser

Patented Sept. 28, 1954

2,690,373

UNITED STATES PATENT OFFICE 2,690,373

INSPECTION AND RECORDING DEVICE

John H. Osgood, Charlestown, N. H., assignor to Jones & Lamson Machine Company, Springfield, Vt., a corporation of Vermont Original application August 11, 1947, Serial No. 768,039, now Patent No. 2,648,912, dated August 18, 1953. Divided and this application June 8, 1953, Serial No. 359,993

3 Claims. (Cl. 346—31)

This invention relates to contour inspection devices and is a division of my U. S. patent application filed August 11, 1947, Serial No. 768,039, now U. S. Patent No. 2,648,912. The invention herein relates more particularly to a recording device which, when used in conjunction with an inspection device of the type described in the aforementioned patent, provides a permanent record of the contour being inspected.

A device which has been used most effectively for the routine inspection of simple objects is the well known optical comparator. Briefly, it comprises a system of optical comparison, the image of the object to be inspected being compared against a standard drawing or outline of the object on a translucent screen. A source of light behind the object casts a shadow or image of the object which is then subjected to suitable magnification in an optical system and reflected upon the screen to be compared against the standard. While the results obtainable with optical comparators are commendable, it is difficult to foresee how, at the present state of the comparator art, such a device may be used without modification to inspect the complex objects as have been referred to hereinabove. Another limitation of the usual comparator, as well as many other inspection devices, is that a permanent record of the inspection results is not made. Such a record is often desirable.

Accordingly, this invention has as a purpose the provision of a device which may be used with an optical comparator to adapt it for the routine inspection as to form, dimensions, and angular relationships of objects defined by complex curved surfaces. A further purpose is to provide a device for the inspection of complex curved surfaces which will permanently record the inspection results, and which will present a record from which the form, dimensions, and angular relationships may be determined. A still further purpose is to provide an inspection device of the nature described which may be operated by an unskilled person with a minimum of instruction. These and other purposes appearing hereinafter are accomplished by the present invention, an understanding of which may be had by reference to the accompanying drawings and the descriptive matter relating thereto. In the drawings, Fig. 1 is a front view, partly in section, of a tracing unit embodying the principles of the present invention.

Fig. 2 is a side view, partly in section, of the tracing unit of Fig. 1.

Fig. 3 is a representation of an optical comparator screen showing the manner of comparing the repeating styli images against master sections on the screen;

Fig. 4 is a side view, partly in section of a recording instrument in accordance with the invention;

Fig. 5 is a plan view of the recorder shown in Fig. 4;

Fig. 6 is a plan view of the recorder repeating arm gear housing unit, partly in section;

Fig. 7 is an end view, partly in section, of the gearing arrangement shown in Fig. 6;

Briefly stated, the inspection device contemplated by the present invention comprises a pair of styli mounted in a tracing unit and movable in three rectangular coordinates, so that the styli may traverse any point of an object to be inspected, electrical means comprising a synchro or selsyn system to transmit intelligence resulting from the various motions of the styli, and a repeating or exhibiting unit where the motions are reproduced, permitting observation of the form, dimensions, and angular relationships of the object under inspection.

In one form of the invention the repeating unit is adapted to be used in conjunction with an optical comparator so that an object may be inspected, the image of which ordinarily cannot be projected onto a comparator screen because of interference with the light path by the warped and complex surfaces of the object.

Figure 1:
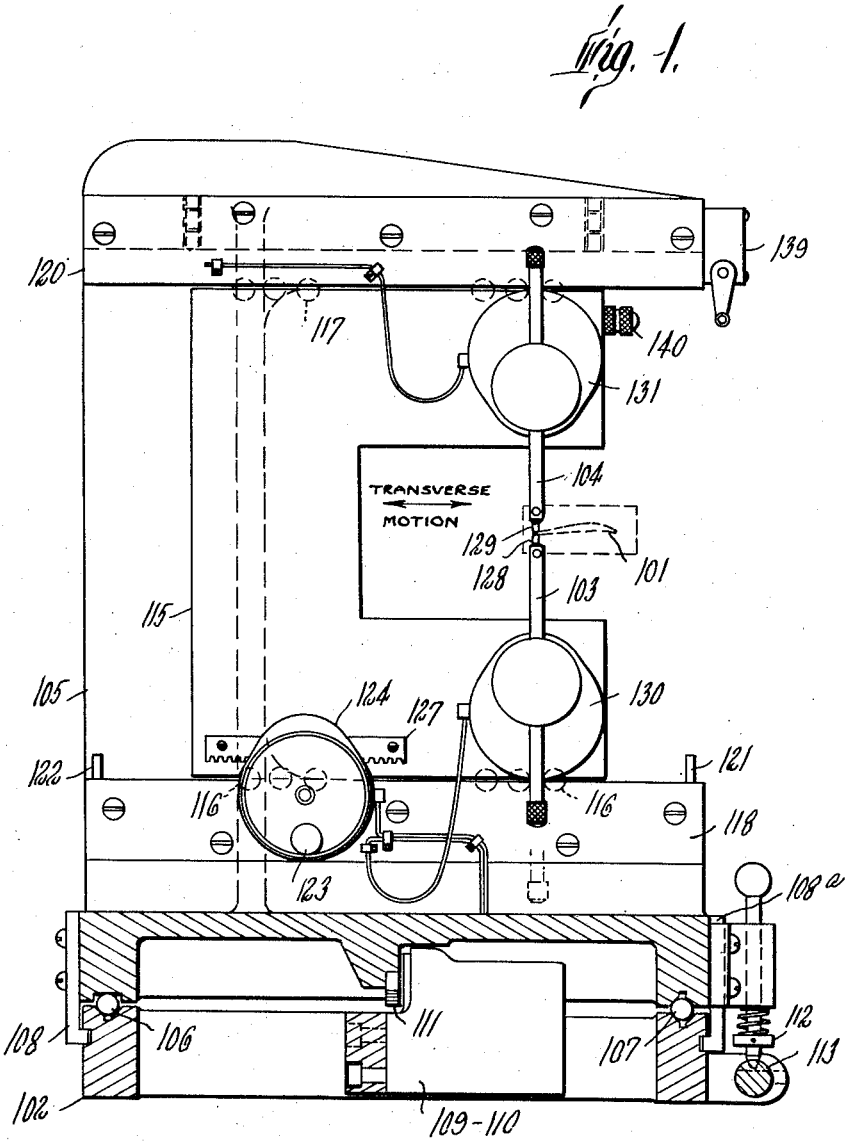

Referring to Figs. 1 and 2 which show two views of the tracing unit 100, the object to be inspected, 101, is fixed in relation to the base 102 of the tracing unit by means of a suitable fixture not shown. The tracing of object 101 is accomplished by styli 103 and 104 which are designed to move in the vertical plane as they traverse any point of the object. Motion of the styli in the longitudinal direction of object 101, that is, in the direction as indicated by Fig. 2, is accomplished through frame 105 which is mounted on base 102 by suitable means such as balls 106 and 107 and gib plates 108 and 108a.

Frame 105 is shown as one casting extending from the base 102 to the top of the tracing unit. A stop mechanism 112 attached to frame 105, and stop bar 113 are provided to limit the motion of frame 105, and thus facilitate the inspection of the object 101 in several predetermined parallel planes, depending upon the number and spacing of the notches 114 in bar 113.

Motion of the styli in the transverse direction of object 101, that is, in the direction as indicated by Fig. 1, and in a direction 90 degrees from the motion of the frame 105, is accomplished by carriage 115 which is mounted in frame 105 by means of balls 116 and 117, ways 118 and 119, and plate 120. Way 118 is provided with stops 121 and 122 to limit the motion of the carriage at the extremities of its travel. The motion of carriage 115 in turn is accomplished by the rotation of crank 123 which is geared through the armature shaft of synchronous electric generator 124 by means of a gear train to rack 127 mounted on the carriage 115. Generator 124 transmits the motion of the carriage to a repeating unit. The two styli 103 and 104 are provided with replaceable tips 128 and 129 of suitable shape and size, such as spherical with a radius of, say, about 1/64 inch, and are geared to two synchronous electric generators 130 and 131 which are mounted in fixed positions on carriage 115. These generators transmit the motions of the styli in the vertical plane to the repeating unit. A convenient manner of gearing the styli is shown in Fig. 5 of my patent referred to above and which forms no part of the present invention.

A repeating unit having styli corresponding to tracing styli 103 and 104 may be used to project the styli in enlarged form onto a screen as shown in Fig. 3. As described in my patent referred to above, the motions undergone by styli 103 and 104 are duplicated by repeating styli. The latter, being within the effective lens aperture of an optical comparator, permits the formation of their respective images by a light source on one side and the magnification and projection onto a comparator screen of these images by the comparator optical system on the other side of the styli. The screen, having been provided with one or more large cross-sectional outlines of object 101 corresponding to the plane or planes inspected, facilitates a comparison of the paths travelled by the repeating styli images against a standard. A comparator screen with several sections drawn thereon is illustrated by Fig. 3, showing the manner in which the styli images may appear on the screen. The first plane of inspection, such as the one near the hub of object 101 described above, may correspond to section A on the screen. Since the images will move in accordance with the actual contours of the object under inspection, any deviations from the standard sections may be noted.

Upon completion of the inspection in one plane, such as that one referred to above, a second plane of inspection may be selected at any predetermined point of the object. The frame 105 of the tracing unit is then moved by lifting stop mechanism 112 and manually sliding the unit on its base to the point where the styli reside in the desired plane. The stop mechanism is then released to engage the notch in stop bar 113 corresponding to the plane to be inspected, and fixing the frame 105 in that plane.

Instead of employing repeating styli, I now contemplate the use of a recording unit 400, so that a continuous record of the inspection results may be obtained. For this purpose the tracing unit of Figs. 1 and 2 is used. The differential generators 109 and 110 as described and claimed in my patent referred to above are no longer necessary and need not be used, but the frame 105 is movable as before and may be locked in place by the stop and bar mechanism at any desired plane of inspection. Synchronous generator 124, instead of being used as a synchronous generator, is a synchronous motor and is operated from the recorder, although the mechanical means for moving carriage 115, namely crank 123 and its associated mechanism, remains unchanged. The frame 105 is provided with a microswitch 139 which is operated by adjustable stop 140 on the carriage 115 to automatically limit the operation and motion of carriage 115 after a trace. Stylus synchronous generators 130 and 131 function as described hereinabove.

The recording unit 400 is shown in Figs. 4 and 5. A roll of paper 401 is mounted in holders 402 and 403 by means of clamps 404 and 405 held in place by spring actuated members 406 and 407. The paper is fed over a plate 408 and then over a driving roll 409 which is provided with teeth or sprockets at the ends thereof to engage with perforations on the sides of the paper, thus achieving a positive drive of the paper. Another roll, 410, presses against the driving roll, being under spring pressure, and maintains close contact between the paper and the driving roll. From the driving roll the paper passes over a curved plate 411, which guides it out to the end of the recording unit where a blade 412 is provided to facilitate tearing off the record after it has been made. The driving roll 409 is actuated by a constant speed electric motor 413 driving through a coupling and worm gear 414 to gear 415 on the driving roll shaft 416. The other side of the driving roll shaft is geared through gears 417 and 418 to a pinion 419 of a synchronous electric generator 420. This generator is electrically connected to synchronous motor 124 of the tracing unit to effect motion of the tracing carriage 115 when the recorder is operated. The housing 421, shown in detail in Figs. 6 and 7, contains two synchronous electric motors 422 and 423 which are operated by impulses received from synchronous generators 130 and 131 of the tracing unit. Each synchronous motor is geared through a suitable gear train, such as pinion 424, gear 425, pinion 426 and gear 427 for one, and pinion 428, gear 429, pinion 430, and gear 431 for the other, to repeating arms 432 and 433 respectively. These arms swing in an arc, and are lightly loaded by means of springs 434 and 435 to maintain unidirectional pressure of the gear teeth at all times, and further to provide a return for the arms. The actual recording on the paper is accomplished by points 436 and 437 which contain a writing compound, or, an electric potential may be utilized between the points and plate 408 to register impressions on an electro-sensitive paper. The latter procedure presents little difficulty since housing 421 is electrically insulated from the main recorder frame 438 by insulating bushings such as at 439 and an insulating plate 440. The circuit may be from a source of electrical potential through the housing 421, arms 432 and 433, points 436 and 437, plate 408, main frame 438, and back to the source.

Figure 8:
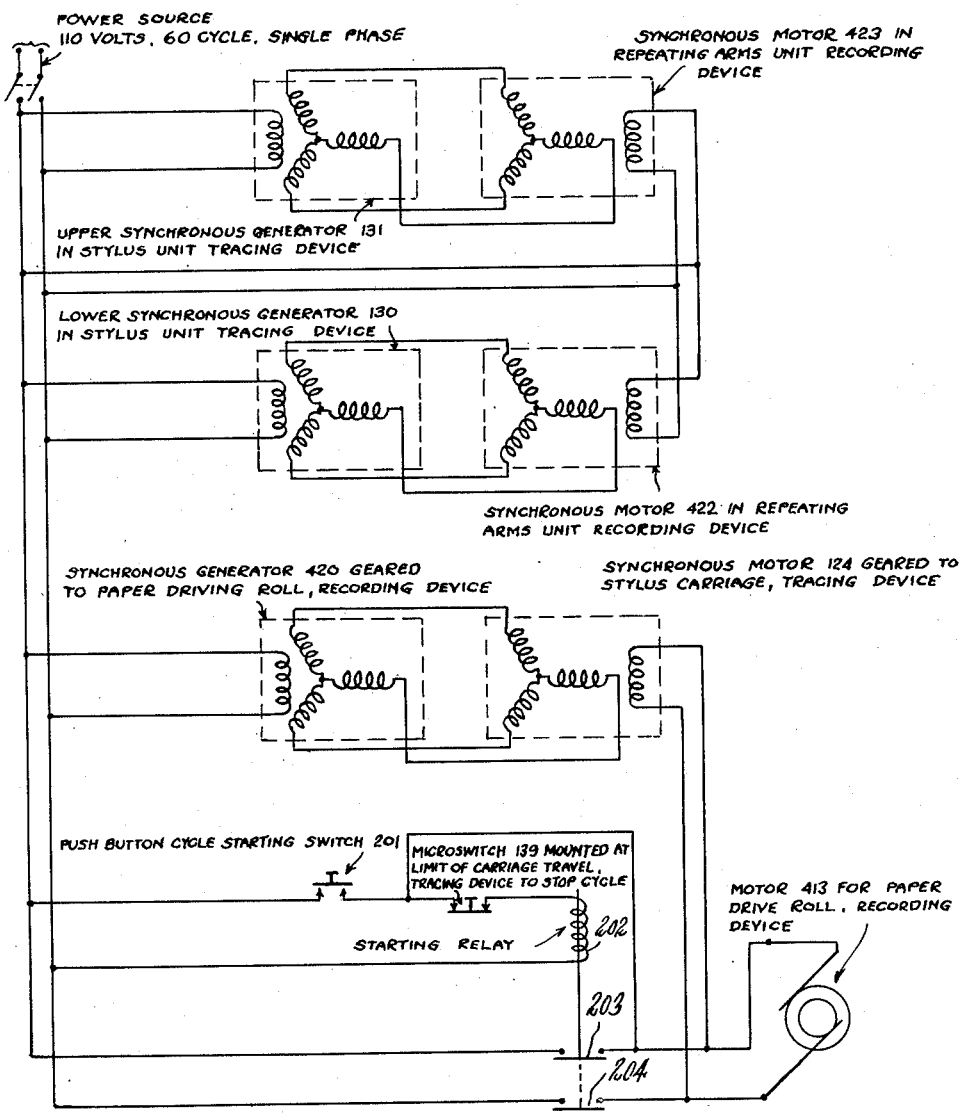
Fig. 8 is a schematic diagram of an electrical system for connecting the tracing and recording units.

Fig. 8 shows the electrical connections between the tracing and recording units. Referring to this and to Figs. 1, 2, 4 and 5, the mode of operation is as follows:

The object 101 to be inspected is placed in a fixed position with respect to the base 102 of the tracing unit. Using the stop mechanism 112 and stop bar 113, the frame is fixed in any desired plane of inspection. The stylus carriage 115 is then manually moved by crank 123 to a position where the styli are adjacent to the object 101, in readiness to start the trace. The pushbutton cycle starting switch 201 is pushed, thereby causing starting relay 202 to close, and a holding contact 203 on the relay keeps the relay energized and closed, once the cycle has been started. At the same time, another contact 204 of the relay completes the circuit of recorder motor 413, putting the recorder paper in motion. This energizes synchronous generator 420 geared to the paper driving roll, and the impulses from this generator are transmitted to synchronous motor 124 of the tracing unit causing the tracing carriage 115 to traverse the object 101. As soon as the carriage moves over the object, styli 103 and 104 energize synchronous generators 130 and 131 of the tracing unit. These impulses in turn are transmitted to synchronous motors 422 and 423 of the recorder, causing recorder arms 432 and 433 to describe the contours of the object under inspection upon the recorder paper. The motions of the arms will be in proportion to the motions of the styli 103 and 104 multiplied by a factor of amplification, this factor being a function of the physical proportions of the arms and their gear trains. For optimum results, the distance the recorder paper travels should be in proportion to the distance the carriage 115 of the tracing unit travels, multiplied by the same factor of amplification as that of the arms. This factor, however, arises from the physical proportions of the gearing between the driving roll 409 and the synchronous generator 420. The combined effect of the motions of the arms and of the paper will cause the form of the object 101 to be drawn on the paper, and the outline so inscribed will be enlarged by the factor of amplification referred to above. The form will be modified, since a vertical motion of tracing stylus causes a repeating arm to swing an arc. Coordinate paper with arcs in one plane and straight lines properly spaced in the other may be used. After the tracing styli have passed over the object, the adjustable stop 140 on the tracing carriage contacts the microswitch 139 which opens the holding circuit of relay 202. This de-energizes the driving motor 402, stopping the recorder paper and the tracing carriage, and, since the synchronous motor system is de-energized, carriage 115 may be reset to its starting position by means of crank 123. Any other section may then be traced using the above procedure. If electrical means are used to register the contours on the recorder paper, relay 202 may be provided with an additional contact to permit the application of an electrical potential between the recorder points and plate 408.

Figure 9:
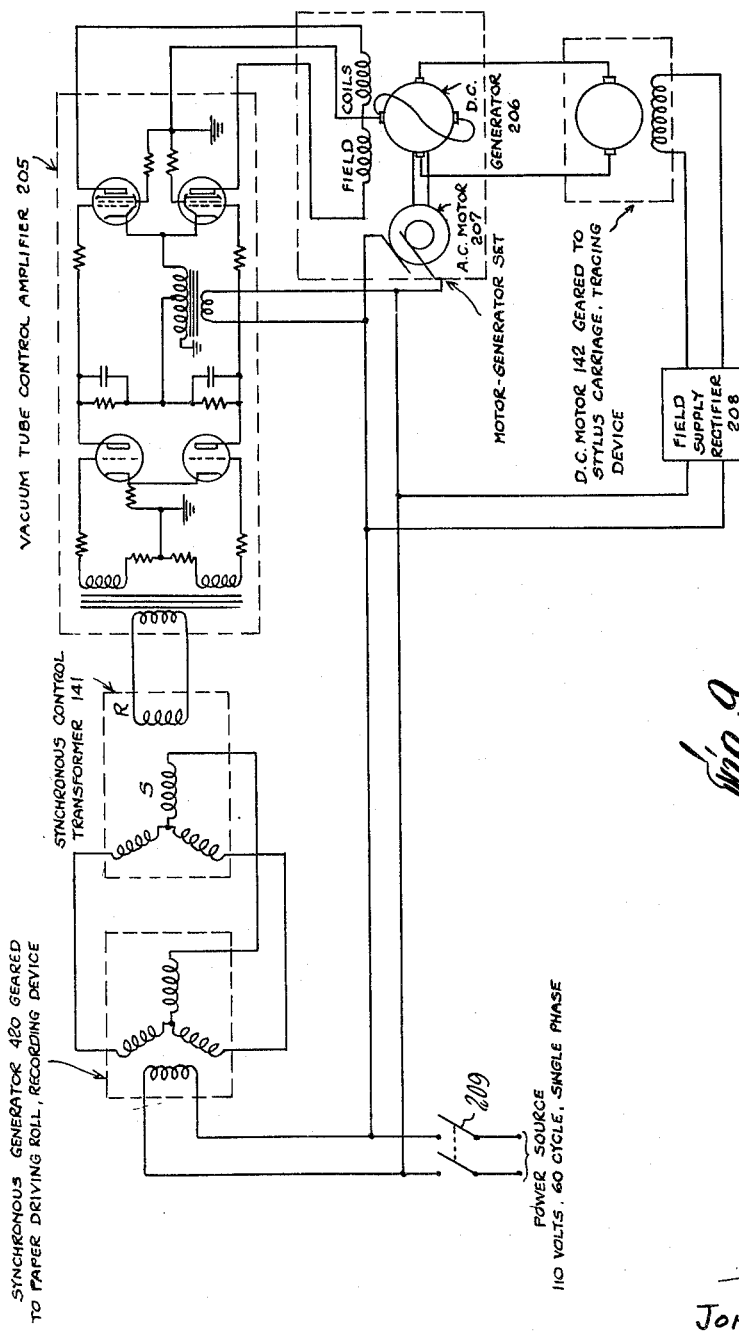
Fig. 9 is a schematic diagram of an alternate electrical system for obtaining power amplification.

Whereas the recorder and tracing unit may be of light weight construction for a great many applications of the invention, it is conceivable that for some purposes, namely where relatively large objects are to be inspected, a much heavier tracing unit would be necessary. The question then arises whether or not the stylus carriage synchronous motor 124 would deliver sufficient torque to overcome the inertial and frictional resistance of such a system. Large synchronous motors and generators are available, or a means for providing power amplification, as is shown in Fig. 9, may be used. Here, the impulses from synchronous generator 420 of the recording unit are fed to the stator S of a synchronous control transformer 141. The carriage 115 of the tracing unit is in this case operated by a D. C. motor 142 instead of a synchronous motor 124 which is replaced by the D. C. motor. Rotor R of the synchronous control transformer is geared to the D. C. motor so that the position of the D. C. motor armature may be compared, in an electrical sense, to the position of the armature of synchronous generator 420. A voltage is produced in rotor R of synchronous control transformer 141 which is proportional to the difference in the angular positions of the two armatures, that is, the voltage is proportional to the error in the position of the armature of the D. C. motor. This error voltage is the output of the synchronous control transformer 141 and is fed into a conventional vacuum tube control amplifier 205 which delivers impulses to the field coils of a D. C. generator 206, operated by A. C. motor 207. The A. C. motor is driven from the same power source as that which is fed to synchronous generator 420. Output from the D. C. generator 206 drives D. C. motor 142, the field of which is supplied with a D. C. source of power by field supply rectifier 208. Switch 209 may correspond to contacts 203 and 204 of the starting relay shown in Fig. 8 to permit resetting of the carriage after each trace.

When the rotor of synchronous generator 420 is moved from a state of rest through some small angle, a new direction of field is induced in the stator of synchronous control transformer 141. The rotor winding of the control transformer, which has been in a state of zero induced voltage, will now develop a voltage due to the new direction of field of the stator. This voltage, increased by the amplifier 205 and fed to the field coils of D. C. generator 206, will cause the D. C. motor to rotate. Because the rotor of the control transformer is geared to the D. C. motor, it must rotate in step with that motor. Furthermore, this rotation is in a direction which will bring the rotor of the control transformer back to a position of zero induced voltage, and the D. C. motor will stop when it has moved through an angle equal to that through which the synchronous generator 420 has moved.

Power amplication of the impulses resulting from any other motions of the contour inspection device may be achieved in a similar manner, using a separate control transformer, amplifier, D. C. motor and motor-generator set for each motion.

The synchronous electric generators and motors of the present invention as referred to throughout the specification and in the appended claims are of the self-synchronous type commonly called "selsyns."

It is perhaps apparent, but nevertheless significant, that the practice of the present invention, using either the optical comparator or the recorder embodiments, will permit the inspection and measurement of the pitch or angular relationships of an object in addition to its cross-sectional contours. By observing the degree of slant from a norm for any particular cross-section, its pitch and the pitch of the object at that plane of inspection may readily be determined.

Although the embodiments of the invention specifically illustrated herein relate to a device using two styli, for some purposes where information regarding but one surface is desired, only one tracing stylus and one repeating stylus or recording arm would be necessary. On the other hand, more than two styli may be advantageously used to obtain simultaneous inspection at any desired number of planes within practical limits by modifications which become apparent to those skilled in the art, they being familiar with the present invention.

It is also to be noted that the invention may be practiced by using one or more styli which are fixed in two coordinates, but movable in accordance with the contours of the object under inspection, and moving the object in relation to the styli by means similar to that employed for moving the styli as set forth above. Then, the relative motion between the styli and the moving object may be resolved along two coordinates, and by synchronous electric means transmitted to exhibiting means to be observed as previously disclosed.

The invention is particularly advantageous where the large scale routine inspection of complex curved objects is desired. It provides a fast, efficient, and accurate inspection device which may be operated by an unskilled person, in contrast to common devices of the same character which are slow and require the extensive training of skilled personnel before such persons are qualified to operate them. However, once a person familiar with the present invention has set up the inspection device and outlined a simple test procedure, any intelligent unskilled person can inspect even the most complex objects. Furthermore, by simply changing the electrical connections between the tracing and exhibiting means from one exhibiting means to another, which may be accomplished by an elementary switching mechanism, the device becomes adapted to produce a permanent record of the inspection results. Such a record is often desirable for research work on objects of the character described to compare their contours before and after operational tests are performed thereon.

Many changes and modifications may be made in the physical construction and in the electrical systems of the invention without departing from its spirit, and it is understood that the invention is not to be limited in its broadest aspect to such details or exemplifications as have been used to describe and illustrate it. The invention may be variously practiced and embodied within the scope of the claims hereinafter made.

I claim:

1. In a contour inspection device having tracing means including surface engaging means and synchronous electric generators associated therewith for generating electrical impulses in accordance with the contours of an object under inspection, exhibiting means comprising a recorder frame, a roll of recording paper therein, a plate over which the paper is driven, means for driving the paper at a constant speed over the plate, a pair of pivotally arranged arms adapted to swing in an arc on said paper and having a driven connection with synchronous electric motors associated with said recorder frame, means associated with each arm for inscribing impressions on the paper, and means for supplying said synchronous electric motors with impulses from said tracing means in accordance with the contours of the object under inspection.

2. In a contour inspection device having tracing means including surface engaging means, a synchronous electric motor for causing the surface engaging means to trace the contours of an object under inspection, and synchronous electric generators associated with said surface engaging means for generating electrical impulses in accordance with the contours of said object, exhibiting means comprising a recorder having a recording medium associated therewith, a constant speed electric motor for driving the recording medium, a synchronous electric generator having a driven connection with said constant speed motor to drive said synchronous electric motor in the tracing means in proportion to the speed of said recording medium, means for inscribing the contours of said object upon the recording medium, synchronous electric motors having a driving connection with said inscribing means and operatively controlled by impulses received from said synchronous electric generators in the tracing means, whereby the contours of the object under inspection are reproduced.

3. A contour inspection device comprising a base, a frame cooperable therewith in a defined path and capable of assuming a fixed position along said path, a movable carriage thereon cooperating therewith in a second path 90 degrees of the aforesaid path, a surface engaging member responsive to contour variations of an inspection object and associated with said movable carriage, inscribing means electrically self-synchronized with said surface engaging member through a selsyn system connected therebetween, a movable recording medium electrically self-synchronized with said movable carriage through a selsyn system connected therebetween and coacting with said inscribing means to exhibit the contours of said inspection object when a section of said object undergoes inspection.

References Cited in the file of this patent

UNITED STATES PATENTS

| Number | Name | Date |
|--------|------|------|
| 2,494,663 | Lobosco | Jan. 17, 1950 |